United States Patent [19]

Burg et al.

[11] 4,277,577
[45] Jul. 7, 1981

[54] THERMOPLASTIC MOLDING COMPOSITIONS ON THE BASIS OF OXYMETHYLENE POLYMERS

[75] Inventors: Karlheinz Burg, Wiesbaden; Werner Schmieder, Kelkheim; Ernst Wolters, Konigstein, all of Fed. Rep. of Germany

[73] Assignee: Hoechst Aktiengesellschaft, Frankfurt am Main, Fed. Rep. of Germany

[21] Appl. No.: 32,292

[22] Filed: Apr. 23, 1979

[30] Foreign Application Priority Data

Apr. 26, 1978 [DE] Fed. Rep. of Germany ....... 2818240

[51] Int. Cl.$^3$ .................... C08L 59/02; C08L 59/04
[52] U.S. Cl. .................... 525/154; 525/130; 525/131; 525/399; 525/400; 260/45.85 B
[58] Field of Search .............. 525/130, 131, 154, 399, 525/400

[56] References Cited

U.S. PATENT DOCUMENTS

| | | | |
|---|---|---|---|
| 3,103,499 | 9/1963 | Dolce | 260/45.7 |
| 3,144,431 | 8/1964 | Dolce | 525/399 |
| 3,174,948 | 3/1965 | Wall | 260/67 |
| 3,219,623 | 11/1965 | Berardinelli | 260/45.95 |
| 3,219,727 | 11/1965 | Kray | 525/154 |
| 3,327,023 | 6/1967 | Schoenholzer | 525/154 |
| 3,476,832 | 11/1969 | Pritchard | 525/154 |
| 3,526,680 | 9/1970 | Cherdron | 525/154 |
| 3,692,876 | 9/1972 | Ackermann | 525/131 |
| 3,704,275 | 11/1972 | Burg | 525/154 |
| 3,763,105 | 10/1973 | Jamison | 525/154 |
| 3,850,873 | 11/1974 | Wurmb | 525/399 |
| 3,980,734 | 9/1976 | Burg | 525/154 |
| 4,079,100 | 3/1978 | Gergen | 525/154 |
| 4,117,933 | 9/1978 | Gale | 525/400 |

FOREIGN PATENT DOCUMENTS

| | | | |
|---|---|---|---|
| 1806704 | 3/1970 | Fed. Rep. of Germany | 525/154 |
| 43-20373 | 9/1968 | Japan | 525/154 |
| 7008606 | 12/1970 | Netherlands | 525/154 |
| 1194453 | 6/1970 | United Kingdom | 525/154 |
| 1252204 | 11/1971 | United Kingdom . | |
| 1503190 | 3/1978 | United Kingdom . | |

*Primary Examiner*—Paul Lieberman
*Attorney, Agent, or Firm*—Curtis, Morris & Safford

[57] ABSTRACT

The invention provides a molding composition of a mixture of an oxymethylene polymer, an elastomer having a softening temperature of below the crystallite melting point of the oxymethylene polymer and a second order transition temperature of from −120° to +30° C., and a segmented thermoplastic copolyester.

The molding composition of the invention is distinguished by improved mechanical properties, especially with respect to the impact strength.

6 Claims, No Drawings

THERMOPLASTIC MOLDING COMPOSITIONS ON THE BASIS OF OXYMETHYLENE POLYMERS

Thermoplastic molding compositions on the basis of oxymethylene polymers, i.e. oxymethylene homopolymers and oxymethylene copolymers, have been known for a long time as a material especially suitable for industrial purposes. It is furthermore known that by mixing these oxymethylene polymers with suitable elastomers, for example with polyesters from linear aliphatic carboxylic acids and $\alpha, \omega$ diols (cf. U.S. Pat. No. 3,795,715), or with copolymers of ethylene and vinyl acetate or acrylic esters according to German Offenlegungsschrift No. 24,49,343, or with copolymers of ethylene and vinyl acetate or acrylic esters according to German Offenlegungsschrift No. 17,69,560, or with polyurethanes from polyhydroxyl compounds, polyisocyanates and chain-lengthening agents according to German Pat. No. 11,93,240, products are obtained the impact strength of which is improved as compared to unmodified oxymethylene polymers.

Disadvantages of these known bicomponent mixtures reside in the fact that some of the mechanical properties, in particular the impact strength of the shaped articles manufactured therefrom, are insufficient for many applications, that furthermore the processing range of these bicomponent mixtures is rather limited, and that in their preparation considerable shearing forces are required for homogenization.

It is therefore the object of the present invention to provide mixtures which are not affected with the above disadvantages. In accordance with this invention, there have been found tricomponent mixtures containing special elastomer components and special processing aids in addition to the oxymethylene polymer.

Subject of the invention are therefore thermoplastic molding compositions on the basis of oxymethylene polymers consisting essentially of a mixture of
(A) from 99.89 to 60 weight % of an oxymethylene polymer;
(B) from 0.1 to 40 weight % of an elastomer having a softening temperature of below the crystallite melting point of the oxymethylene polymer according to (A) and a second order transition temperature of from −120° to +30° C.; and
(C) from 0.01 to 20 weight % of a segmented thermoplastic copolyester or a polyurethane.

The amount of oxymethylene polymer used as component A is preferably from 99.49 to 80 weight %, the amount of the elastomer component B is preferably from 0.5 to 20 weight %, and the amount of the processing acid C preferably from 0.01 to 10 weight %.

Especially good results are obtained using a mixture which is composed of from 98.5 to 90 weight % of component A, from 1.0 to 10 weight % of component B, and from 0.05 to 5 weight % of component C.

Components A, B and C for their part may consist each of polymer or copolymer mixtures corresponding to the definitions of A, B, and C, respectively, which are given as follows:

By oxymethylene polymers used as component A, there are to be understood especially homopolymers of formaldehyde or trioxan, or trioxan copolymers having preferably a linear structure.

By homopolymers of formaldehyde or trioxan there are to be understood those formaldehyde or trioxan homopolymers the hydroxyl terminal groups of which are stabilized against degradation by chemical reaction in known manner, e.g. by esterification or by etherification.

By trioxan copolymers there are to be understood copolymers of trioxan and cyclic ethers, cyclic acetals and/or linear polyacetals which have primary alcohol terminal groups.

Comonomers for trioxan are
(a) cyclic ethers having 3, 4 or 5, preferably 3 ring members, or
(b) cyclic acetals other than trioxan having from 5 to 11, preferably 5, 6, 7 or 8 ring members, and
(c) linear polyacetals, in an amount of from 0.1 to 20, preferably from 0.5 to 10 weight % each.

Most suitable are copolymers of from 99 to 95 weight % of trioxan and from 1 to 5 weight % of one of said co-components.

Especially suitable comonomers for trioxan are compounds of the formula I

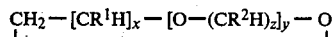

wherein (A) $R^1$ and $R^2$ are identical or different, and each represent a hydrogen atom, an aliphatic alkyl radical having from 1 to 6, preferably 1, 2, 3 or 4 carbon atoms, or a phenyl radical; and (a) x is 1, 2 or 3 and y is zero; or (b) x is zero, y is 1, 2 or 3, and z is 2; or (c) x is zero y is 1 and z is 3, 4, 5 or 6; or (B) $R^1$ is an alkoxymethyl radical having from 2 to 6, preferably 2, 3 or 4 carbon atoms, or a phenoxymethyl radical where x is 1 and y is zero, and $R^2$ is as defined above.

Suitable cyclic ethers are particularly epoxides, e.g. ethylene oxide, styrene oxide, propylene oxide, or epichlorohydrin as well as phenylglycidyl ether.

Suitable cyclic acetals are especially cyclic formals of aliphatic or cycloaliphatic $\alpha, \Omega$-diols having from 2 to 8, preferably 2, 3 or 4 carbon atoms, the carbon chain of which may be interrupted in intervals of two carbon atoms by an oxygen atom, e.g. glycolformal(1,3-dioxolan), propanediol formal(1,3-dioxan), butanediol formal(1,3-dioxepane) and diglycol formal(1,3,6-trioxocane) as well as 4-chloromethyl-1,3-dioxolan, hexanediol formal(1,3-dioxonane).

Unsaturated formals such as butanediol formal(1,3-dioxacycloheptene-[5]) may likewise be used.

Suitable linear polyacetals are homopolymers or copolymers of the above cyclic acetals and also linear condensates of aliphatic or cycloaliphatic $\alpha,\omega$-diols with aliphatic aldehydes, preferably formaldehyde. Preference is given to the use of homopolymers of cyclic formals of aliphatic $\alpha,\omega$-diols having from 2 to 8, preferably 2, 3 or 4 carbon atoms, for example poly(1,3-dioxolan), poly(1,3-dioxan) and poly(1,3-dioxepan).

As additional comonomers for trioxan are optionally employed further compounds with several polymerizable groups in the molecule, e.g. alkyl glycidyl formals, polyglycol diglycidyl ethers, alkanediol glycidyl ethers or bis-(alkanetriol)triformals, in an amount of from 0.05 to 5, preferably from 0.1 to 2 weight %, calculated on the total quantity of monomers.

By alkyl glycidyl formals there are to be understood compounds of the formula (II)

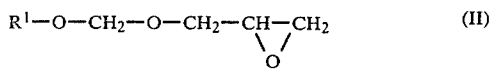

wherein $R^1$ represents an aliphatic alkyl radical having from 1 to 10, preferably from 1 to 5 carbon atoms. Especially suitable are alkylglycidyl formals of the above formula with linear, saturated, aliphatic alkyl radicals, e.g. methylglycidyl formal, ethylglycidyl formal, propylglycidyl formal or butylglycidyl formal.

Polyglycol diglycidyl ethers are compounds of the formula (III)

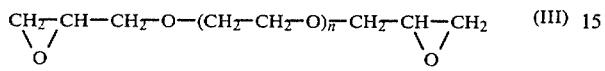

wherein n represents an integer from 2 to 5. Especially suitable are polyglycoldiglycidyl ethers of the aforementioned formula, wherein n represents 2 or 3, e.g. diethylene glycol diglycidyl ether and triethylene glycol compounds of the formula (IV)

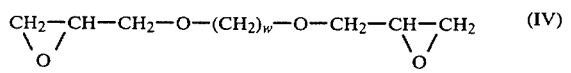

wherein w represents an integer from 2 to 6, preferably 2, 3 or 4. Especially suitable is butanediol diglycidyl ether.

By bis(alkanetriol)-triformals there are to be understood compounds with one linear and two cyclic formal groups, especially compounds of formula (V)

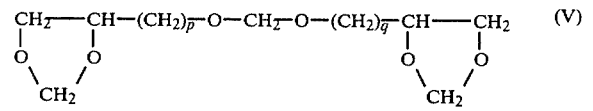

wherein p and q each represent an integer of from 3 to 9, preferably 3 or 4. Especially suitable are symmetric bis(alkanetriol)-triformals of the aforementioned formula, in which p and q are the same integer, e.g. bis(1,2,5-pentanetriol)-triformal and preferably bis(1,2,6-hexanetriol)-triformal.

The values for the reduced specific viscosity (RSV-values) of the oxymethylene polymer (measured on a solution of the polymer in butyrolactone stabilized with 2 weight % of diphenylamine, at 140° C. and a concentration of 0.5 g/100 ml) are generally from 0.3 to 2.0 dl.g$^{-1}$, preferably 0.5 to 1.5 dl.g$^{-1}$.

The crystallite melting point of the oxymethylene polymers is from 140° to 180° C., preferably from 150° to 170° C., their density varies from 1.38 to 1.45 g.ml$^{-1}$, preferably 1.40 to 1.43 g.ml$^{-1}$ (measured according to DIN 53 479.

The trioxan copolymers used according to the invention, being preferably binary or tertiary, are prepared in known manner by polymerizing the monomers in the presence of cationically active catalysts at temperatures of from zero to 100° C., preferably from 50° to 90° C. (of. e.g. U.S. Pat. No. 3,027,352).

As catalysts there are preferably used, for example, Lewis acids, e.g. boron trifluoride and antimony pentafluoride, and complex compounds of Lewis acids, preferably etherates, e.g. boron trifluoride-diethyl etherate and boron trifluoride-di-tert.-butyl-etherate. Also suitable are protonic acids, e.g. perchloric acid, as well as salt-like compounds, e.g. triphenylmethyl hexafluorophosphate, triethyloxonium tetrafluoroborate or acetyl perchlorate. The polymerization may be carried out in the mass, in suspension or in solution. For eliminating unstable portions, the copolymers are advantageously subjected to a thermally or hydrolytically controlled partial degradation to obtain primary alcohol terminal groups (of. U.S. Pat. No. 3,103,499 and 3,219,623).

The hompolymers of formaldehyde or of trioxan used according to the invention are also prepared in known manner by catalytic polymerization of the monomer (of. e.g. U.S. Pat. Nos. 2,768,994 and 2,989,505).

By elastomers used as component B, there are to be understood preferably homo- copolymers of olefinically unsaturated compounds of the formula (VI)

in which $R_1$ is a hydrogen atom or a methyl or ethyl radical, and $R_2$ is a hydrogen atom, a carboxyl group or the corresponding salts with a metal of the Ist to IIIrd group of the Periodic Table, especially alkali metal salts, alkaline earth metal salts or zinc salts, an alkylcarboxy group having from 2 to 10, preferably 2 to 5, carbon atoms, an acyloxy group having from 2 to 5, preferably 2 or 3, carbon atoms, a cyano group, a phenyl radical or a vinyl radical; the softening temperature of which is below the crystallite melting point of the corresponding oxymethylene polymer, preferably from 50° to 160° C., and the second order transition temperature of which is from $-120°$ to $+30°$ C., preferably from $-80°$ to 0° C.

The following examples may be cited:

(1) Homo- and copolymers of alpha-olefins, for example polyethylene, ethylene/propylene copolymers, ethylene/acrylic ester copolymers, ethylene/methacrylic ester copolymers, ethylene/acrylic acid copolymers. Especially suitable are polyethylene or copolymers of ethylene with vinyl acetate, or copolymers of ethylene with acrylic esters, preferably the methylacrylic, ethylacrylic, butylacrylic or 2-ethylhexylacrylic ester, where the amount of ethylene is from 40 to 90, preferably 50 to 80 weight %.

(2) Homo- and copolymers of 1,3-dienes having 4 to 5 carbon atoms, for example polybutadiene, polyisoprene, butadiene/styrene copolymers, butadiene/acrylonitrile copolymers.

(3) Homo- and copolymers of vinyl esters, for example polyvinyl acetate, polyvinyl propionate, polyvinyl butyrate.

(4) Homo- and copolymers of acrylic and methacrylic esters, for example polyethylacrylate, polybutylacrylate, polybutylmethacrylate, polyhexylmethacrylate, poly-2-ethylhexylmethacrylate, polyoctylmethacrylate.

The molecular weight (average weight) of the elastomers used in accordance with the invention may vary within wide limits. Suitable are products having a molecular weight of from 1000 to 1,000,000, preferably from 1000 to 300,000; especially good results are obtained using cocomponents having a molecular weight of from 5000 to 150,000. The melt flow index (at 190° C.

and a load of 2.16 kg) is generally from 1 g/10 min to 1000 g/10 min. preferably 10 g/10 min to 500 g/10 min.

By processing aids used as component C, there ar to be understood segmented thermoplastic copolyesters or polyurethanes having a durometer hardness (ASTM D-2240) of from A 75 to 96 or/and from D 40 to D 72, which have generally an elastomeric character.

The RSV values (measured at 25° C. in a phenol/carbon tetrachloride mixture in a weight ratio of 3:2 and a concentration of 1 g/100 ml) are generally from 0.8 to 3.2 dl/g$^{-1}$, preferably 1.5 to 3.0 dl/g$^{-1}$.

The copolyesters are composed of (a) long-chain ester units and (b) short-chain ester units which are linked with one another by means of ester linkage in head-tail-combination. The amount of the long-chain ester units is preferably from 70 to 50 weight % and that of the short-chain ester units is preferably from 30 to 50 weight %. The ester units occur in the copolyester macromolecules in random distribution.

As acid component in the long-chain and th short-chain ester units, there are used aromatic dicarboxylic acids having a molecular weight of a maximum 300, preferably of from 166 to 250. Especially suitable are aromatic dicarboxylic acids having from 8 to 16, preferably 8 to 12 carbon atoms. As examples may be cited phenylene-dicarboxylic acids, that is, terephthalic acid and isophthalic acid, furthermore naphthalene-1,5-dicarboxylic acid, naphthalene-2,6-dicarboxylic acid, naphthalene-2,7-dicarboxylic acid, 4,4'-dicarboxydiphenyl, bis(4-carboxyphenyl)-methane, bis-(4-carboxyphenyl)-ethane, bis(4-carboxyphenyl)-ether, bis-(4-carboxyphenyl)-sulfone, 1,2-bis(4-carboxyphenyl)-ethane, anthracene-5,10-dicarboxylic acid, anthracene-1,4-dicarboxylic acid, anthracene-1,5-dicarboxylic acid and anthracene-2,6-dicarboxylic acid. The above free acids may be replaced by the corresponding halides, preferably chlorides, or esters with lower alcohols, preferably dimethyl ester. The dicarboxylic acids or their derivatives are used either alone or as a mixture, preferably as a mixture of therephthalic acid and isophthalic acid. The longchain ester units contain as alcohol component diols having a molecular weight of from 350 to 8,000, preferably 600 to 6,000 (numerical average). Especially suitable are homopolymers, copolymers and block copolymers, which contain terminal hydroxyl groups, of alkylene oxides having from 2 to 9, preferably 2, 3, 4 or 5 carbon atoms in the ring, e.g. poly(ethylene oxide), poly-(propylene oxide), poly(butylene-1,2-oxide), polyoxethane, polyoxolane, polyoxane, polyoxepane, polyoxocane and polyoxonane as well as ethylene oxide/propylene oxide copolymers, ethylene oxide/oxolane copolymers and ethylene oxide/propylene oxide block copolymers. Suitable are furthermore polyformals with terminal hydroxyl groups which are prepared by reaction of formaldehyde with one or several aliphatic diols having from 2 to 9, preferably 2, 3, 4 or 5 carbon atoms, e.g. ethylene glycol polyformal, diethylene glycol polyformal, propanediol-(1,3)-polyformal, butanediol-(1,2)-polyformal, propanediol-(1,2)-polyformal, butanediol-(1,4)-polyformal, pentanediol-(1,5)-polyformal, and hexanediol-(1,6)-polyformal. The alcohol component may also consist of a mixture of several of the above diols.

The short-chain ester units contain as alcohol component diols with molecular weights of a maximum 250, preferably of from 64 to 150. Especially suitable are aliphatic diols having from 2 to 15, preferably 2 to 8 carbon atoms, e.g. ethylene glycol, diethylene glycol, propanediol-(1,2), propanediol-(1,3), 2,2-dimethyl propanediol-(1,3), butanediol-(1,4), pentanediol-(1,5), hexanediol-(1,6), decanediol-(1,10), 1,4-dihydroxymethyl-cyclohexane and bis(4-hydroxymethylcyclohexyl)-methane. The alcohol component may also consist of a mixture of several of the aforementioned diols. If the short-chain ester units contain more than one alcohol component and/or acid component, at least 50 percent of the total number of short-chain ester units have to be identical.

Copolyesters, which are prepared from polyoxolane having terminal hydroxyl groups and a molecular weight of from 800 to 2,000 (numerical average), and terephthalic acid, isophthalic acid and butanediol-(1,4), are especially suitable components (C) of the molding composition according to the invention.

The copolyesters used according to the invention are prepared according to known processes (cf. e.g. U.S. Pat. Nos. 3,023,192 and 3,651,014). Usually, the dicarboxylic acid or the mixture of dicarboxylic acids in the form of the dimethyl ester is heated to a temperature of from 150° to 260° C., in the presence of a catalyst, together with a long-chain diol and an excess of a short-chain diol. Particularly preferred catalysts are organic titanates, e.g. tetrabutyltitanate, optionally combined with magnesium acetate or calcium acetate. After having eliminated the methanol formed by the ester interchange reaction and excess reaction components, preferably by distillation, the elastomeric copolyester is obtained in ready-for-use state.

Furthermore, there are used as component C in accordance with the invention polyurethanes prepared in known manner according to the isocyanate polyaddition process. They are obtained by easily controllable methods on the basis of most diverse polyisocyanates or polyhydroxy compounds having a molecular weight of about 500 to 4000 (numerical average) and chain-lengthening agents such as polyfunctional low molecular weight polyalcohols, polyamines, water, hydrazines, oxethylated ureas, oxethylated polyphenols or aromatic polyamines. The structure and kind of the terminal groups of the high molecular weight polyaddition products can be varied within wide limits by a corresponding choice of the reactants and their quantitative ratio, the temperature control, and by chain-lengthening and branching reactions proceeding differently and in the presence or absence of catalysts.

The products used are high molecular weight polyurethanes prepared from polyesters or polyethers, such as polyethyleneglycol ethers, polypropyleneglycol ethers or polybutyleneglycol ethers, polyester amides, polythiothers or polyacetals having a molecular weight of from 500 to 4000, or the graft derivatives thereof with, for example, acrylonitrile, vinyl acetate, vinyl chloride or aromatic or aliphatic polyisocyanates, and chain-lengthening agents such as low molecular weight glycols or water. Preferably, they should have a relatively low degree of branching and an inner viscosity of from 0.4 to 2 (measured at 30° C. in dimethyl formamide), and their terminal groups may be OH, NCO, amino, hydrazine or substituted amino groups. Furthermore, such preferably used polyurethanes may contain within their chains uretdione rings or unsaturated polymerizable groups or groups which can be cross-linked with sulfur, for example radicals of allylmonoglycol ether or 1,4-butenediol, furthermore radicals of compounds capable of being cross-linked with formaldehyde, for example of oxethylated aromatic polyphenols, bis-hydroxy-ethylated aniline, m-toluidine, xylidine, hydroxy-alkylated ureas, urethanes or amides.

In the case where the cited polyurethane compositions are branched or cross-linked to a substantial extent, it is advantageous that the branch chains consist of bonds which can be easily separated by heat treatment, for example allophanate or biuret branch chains which can be formed for example according to French Pat. No. 1,339,349 by using orthosubstituted polyisocyanates. Likewise suitable are chain-lengthening polyurethane compositions prepared according to the operation mode of the French Pat. No. 1,358,139 with an excess of more than 500% of polyisocyanate, where optionally unsaturated polyhydroxy compounds, and polymerizable monomer vinyl compounds used as cross-linking agent are employed in addition.

The molding composition according to the invention is advantageously prepared by mixing the components, which are present preferably as powders or granules, and subsequent homogenization. Mixing is usually carried out at room temperature, preferably at a temperature of from 15° to 30° C. and the homogenization is performed in heatable mixing devices of any kind, e.g. rollers, calenders, kneaders or extruders, at a temperature above the crystallite melting point of the oxymethylene polymer, i.e. at a temperature of from 150° to 250° C., preferably of from 170° to 220° C.; especially favorable is a temperature of from 175° to 200° C. Both components of the molding composition according to the invention must be suitable for processing within said temperature range.

In the homogenation, partial cross-linking of the elastomer component may possibly occur, which, however, does in general not adversely affect the properties of the mixture.

The molding composition according to the invention may optionally contain known additives, especially stabilizers and/or fillers, furthermore nucleating agents, antistatic agents, flame-proofing agents, lubricants and mold release agents, plasticizers, pigments, dyestuffs or brightening agents.

Especially suiable stabilizers against the influence of heat are polyamides, amides of polybasic carboxylic acids, amidines, e.g. dicyanodiamine, hydrazines, ureas, poly(N-vinyl-lactams) and alkaline earth metal salts of aliphatic mono- to tribasic preferably hydroxyl group containing carboxylic acids having from 2 to 20 carbon atoms, e.g. calcium stearate, calcium ricinoleate, calcium lactate an calcium citrate. As antioxidants are preferably used bisphenol compounds, especially diesters of monobasic 4-hydroxyphenyl alkane acids having from 7 to 13, preferably 7, 8 or 9 carbon atoms, with diols having from 2 to 6 carbon atoms. Suitable light stabilizers are α-hydroxybenzophenone derivatives and derivatives of benzotriazoles. The stabilizers are employed in a total amount of from 0.1 to 5, preferably from 0.5 to 3 weight % (calculated on the total molding composition).

As fillers there may be used for example asbestos fibers, glass fibers, glass powder, graphite, carbon black, metal powder, metal oxides, silicates, carbonates and molybdenum (IV)-sulfide. The amount of filler is from 10 to 70, preferably from 20 to 40 weight % (calculated on the total molding composition).

The molding compositions of the invention consisting of the oxymethylene polymer A, the elastomer component B and the processing aid C are distinguished by improved mechanical properties, especially improved impact strength, as compared to the aforementioned bicomponent mixtures of oxymethylene polymer and an elastomer component. This synergistic behavior of elastomers which are likewise effective per se was not to be expected in view of the very different chemical structure of the components. Also surprising is the fact that homogenization of the tricomponent mixtures of the invention is obtained with considerably less shearing forces in the mixing equipment than those described for bicomponent mixtures in German Offenlegungsschrift No. 17,69,560. A further advantage of the molding compositions of the invention resides in the fact that the conditions of thermoplastic processing to yield shaped articles can be varied within wide limits without adversely affecting the impact strength.

The molding composition according to the invention may be comminuted mechanically, e.g. by crushing or grinding, to yield granules, chips, flakes or powder. It is thermoplastic and processed by injection molding, extrusion, melt spinning or deep drawing. It is a suitable material for the manufacture of semi-finished and finished articles such as molded pieces, e.g. ribbons, rods, plates, films and sheets, tubes and hoses, as well as machine parts, e.g. casings, gear wheels, bearing parts and control units.

The following examples illustrate the invention. The data indicated in these examples are determined as follows:

RSV value
  (a) Oxymethylene polymer: measured in butyrolactone, stabilized with 2 weight % of diphenylamine, at 140° C. in a concentration of 0.5 g/100 ml.
  (b) Component C: measured in phenol/carbon tetrachloride mixture in a weight ratio of 3:2 at 25° C. in a concentration of 1 g/100 ml.

Melt flow index
  Measured at 190° C. and a load of 2.16 kg according to ASTM D-1238.

Molecular weight
  Determined according to the gel chromatography method.

Durometer hardness
  According to ASTM D-2240.

Softening point
  Determined according to the so-called ring/ball method (ASTM E-28).

Density
  According to DIN 53 479.

Impact strength
  Measured by means of a drop test. The plate to be tested is clamped onto a frame and subjected to an impact strain by causing a drop-hammer having a weight of 500 g, the hitting part of which is designed as a hemisphere having a diameter of 2 cm, to drop vertically and in frictionless motion onto the plate from a different height each. As the measure for the impact strength, that height is indicated from which 50% of the plates are destroyed by the hammer (average of 25 drop tests). The maximum height of drop is 250 cm.

EXAMPLES

Varying parts by weight of components A (oxymethylene polymer), B (elastomer) and C (processing aid) in the form of powder or granules are mixed at room temperature, optionally with addition of suitable stabilizers, melted in a double-screw extruder at 200° C., homogenized and ejected as strand. The residence time in the extruder is about 4 minutes. The strand is cut into short pieces, and the dried granules obtained are injection-molded in a corresponding machine to give plates having dimensions of 60×60×2 mm.

1. Component A I

Copolymer of 98 weight % of trioxan and 2 weight % of ethylene oxide containing primary alcohol terminal groups and having a RSV value of 0.8 dl/g$^{-1}$, a density of 1.41 g/cm$^{-3}$ and a crystallite melting point of 166° C.

0.1% of calcium ricinoleate and 0.5% of 1,6-bis-[β-3,5-di-tert.-butyl-4-hydroxyphenyl)-propionyloxy]-hexane were used as stabilizer.

2. Component A II

Copolymer according to A I, having however a RSV value of 1.1 dl/g$^{-1}$.

3. Component A III

Copolymer accoding to A I, having however a RSV value of 0.63 dl/g$^{-1}$.

4. Component A IV

Polyformaldehyde the semi-acetal terminal groups of which are blocked by reaction with acetic anhydride, and which has a RSV value of 0.8 dl/g$^{-1}$, a density of 1.43 g/cm$^{-3}$ and a crystallite melting point of 181° C.

1% of mixed polyamide of caprolactam, hexamethylenediamine, adipic acid and sebacic acid, and 0.3% of bis-[β-(3,5-di-tert.-butyl-4-hydroxyphenyl)-propionyloxy]-hexane were used as stabilizer.

5. Component B I

Copolymer of ethylene and vinyl acetate, the vinyl acetate amount of which is 32-34 weight %, and which has a melt flow index of 22-28 g/10 min. The density is 0.957 g/cm$^{-3}$ and the durometer hardness 67 A. Softening point=116° C.

6. Component B II

Copolymer of ethylene and vinyl acetate, the vinyl acetate amount of which is 27-29 weight %, and which has a melt flow index of 125-127 g/10 min. The density is 0.949 g/cm$^{-3}$ and the durometer hardness 67 A. Softening point=88° C.

7. Component C I

Copolyester prepared from 390 parts by weight of terephthalic acid dimethyl ester, 100 parts by weight of isophthalic acid dimethyl ester, 195 parts by weight of butanediol-1,4 and 447 parts by weight of polyoxolane having a molecular weight of 1000 (numerical average). Its density is 1.17 g/cm$^{-3}$, the RSV value 2.78 dl/g$^{-1}$ and the durometer hardness 92 A.

8. Component C II

Copolyester according to C I without the use of isophthalic acid dimethyl ester. The durometer hardness in this case is 55 D or 97 A. The density is 1.20 g/cm$^{-3}$.

9. Component C III

Copolyester according to C II having a durometer hardness of 63 D or 100 A. Density: 1.22 g/cm$^{-3}$.

10. Component C IV

Polyester-urethane having a durometer hardness of 78 A, a density of 1.18 g/cm$^{-3}$ and a Vicat softening temperature (ASTM D-1525) of 90° C.

11. Component C V

Polyester-urethane, durometer hardness 55 D, density 1.22 g/cm$^{-3}$, Vicat softening temperature 160° C.

| Example No. | Oxymethylene polymer | Elastomer | processing aid | Height of drop [cm] |
|---|---|---|---|---|
| Comparison | 100 A I | — | — | 19 |
| " | 92 A I | 8.0 B I | — | 213 |
| " | 92 A I | — | 8.0 C I | 160 |
| 1 | 92 A I | 4.0 B I | 4.0 C I | >250 |
| 2 | 92 A I | 7.2 B I | 0.8 C I | >250 |
| 3 | 92 A I | 7.9 B I | 0.1 C I | 220 |
| Comparison | 95 A I | 5.0 B I | — | 180 |
| " | 95 A I | — | 5.0 C I | 135 |
| 4 | 95 A I | 2.5 B I | 2.5 C I | >250 |
| 5 | 95 A I | 4.5 B I | 0.5 C I | >250 |
| 6 | 95 A I | 4.9 B I | 0.1 C I | 225 |
| Comparison | 97 A I | 3.0 B I | — | 181 |
| " | 97 A I | — | 3.0 C I | 80 |
| 7 | 97 A I | 2.0 B I | 1.0 C I | 238 |
| 8 | 97 A I | 2.5 B I | 0.5 C I | 214 |
| 9 | 97 A I | 2.75 B I | 0.25 C I | 230 |
| 10 | 97 A I | 2.85 B I | 0.15 C I | 240 |
| 11 | 97 A I | 2.95 B I | 0.05 C I | 246 |
| Comparison | 99 A I | 1.0 B I | — | 71 |
| " | 99 A I | — | 1.0 C I | 29 |
| 12 | 99 A I | 0.99 B I | 0.01 C I | 110 |
| Comparison | 97 A I | 3.0 B II | — | 120 |
| " | 97 A I | — | 3.0 C I | 80 |
| 13 | 97 A I | 1.5 B II | 1.5 C I | >250 |
| 14 | 97 A I | 2.55 B II | 0.45 C I | >250 |
| Comparison | 97 A I | 3.0 B I | — | 181 |
| " | 97 A I | — | 3.0 C II | 60 |
| 15 | 97 A I | 2.85 B I | 0.15 C II | >250 |
| 16 | 97 A I | 2.25 B I | 0.75 C II | >250 |
| Comparison | 97 A I | 3.0 B I | — | 200 |
| " | 97 A I | — | 3.0 C II | 39 |
| 17 | 97 A I | 2.25 B I | 0.75 C III | >250 |
| 18 | 97 A I | 2.85 B II | 0.15 C II | 240 |
| 19 | 97 A I | 2.55 B II | 0.45 C III | >250 |
| Comparison | 97 A I | — | 3.0 C IV | 45 |
| 20 | 97 A I | 2.85 B I | 0.15 C IV | 230 |
| Comparison | 97 A I | — | 3.0 C V | 60 |
| 21 | 97 A I | 2.85 B I | 0.15 C V | 200 |
| Comparison | 100 A II | — | — | 14 |
| " | 97 A II | 3.0 B I | — | 48 |
| " | 97 A II | — | 3.0 C I | 18 |
| 22 | 97 A I | 2.85 B I | 0.15 C I | 59 |
| Comparison | 100 A III | — | — | 35 |
| " | 97 A III | 3.0 B I | — | 210 |
| " | 97 A III | — | 3.0 C I | 96 |
| 23 | 97 A III | 2.85 B I | 0.15 C I | >250 |
| Comparison | 100 A IV | — | — | <13 |
| " | 97 A IV | 3.0 B I | — | 150 |
| " | 97 A IV | — | 3.0 C I | 25 |
| 24 | 97 A IV | 2.55 B I | 0.45 C I | >250 |

What is claimed is:

1. Molding composition consisting essentially of a mixture of (A) from 99.89 to 60 weight % of an oxymethylene polymer;

(B) from 0.1 to 40 weight % of an elastomer having a softening temperature of below the crystallite melting point of the oxymethylene polymer according to (A) and a second order transition temperature of from −120° to +30° C.; and (C) from 0.01 to 20 weight % of a segmented thermoplastic copolyester.

2. Molding composition as claimed in claim 1, wherein component A has a reduced specific viscosity of from 0.5 to 1.5 dl/g$^{-1}$.

3. Molding composition as claimed in claims 1 or 2, wherein component A is a copolymer of trioxan and a compound of the formula

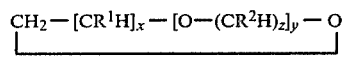

wherein (A) $R^1$ and $R^2$ are identical or different, and each represent a hydrogen atom, an aliphatic alkyl radical having from 1 to 6, preferably 1, 2, 3 or 4 carbon atoms, or a phenyl radical; and (a) x is 1, 2 or 3 and y is zero; or (b) x is zero, y is 1, 2 or 3, and z is 2; or (c) x is zero, y is 1 and z is 3, 4, 5 or 6; or (B) $R^1$ is an alkoxymethyl radical having from 2 to 6, preferably 2, 3 or 4 carbon atoms, or a phenoxymethyl radical where x is 1 and y is zero, and $R^2$ is as defined above.

4. Molding composition as claimed in claims 1, 2 or 3, wherein component B is a homo- or copolymer of olefinically unsaturated compounds of the formula

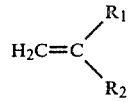

in which $R_1$ is a hydrogen atom or a methyl or ethyl radical, and $R_2$ is a hydrogen atom, a carboxyl group or the corresponding salts with a metal of the Ist to IIIrd group of the Periodic Table, an alkylcarboxy group having from 2 to 10 carbon atoms, an acyloxy group having from 2 to 5 carbon atoms, a cyano group, a phenyl radical or a vinyl radical.

5. Molding composition as claimed in claims 1, 2, 3 or 4, wherein component B has an average molecular weight of from 5000 to 150.000.

6. Molding composition as claimed in claims 1, 2, 3, 4 or 5, wherein component C is a copolyester consisting of
 (a) from 75 to 35 weight % units of an ester of at least one aromatic dicarboxylic acid having a molecular weight of a maximum 300 and a diol having a molecular weight of from 350 to 8000, and
 (b) from 25 to 65 weight % units of an ester of at least one aromatic dicarboxylic acid having a molecular weight of a maximum 300 and a diol having a molecular weight of a maximum 250.

* * * * *